US 8,468,509 B2

(12) United States Patent
Robison (10) Patent No.: US 8,468,509 B2
(45) Date of Patent: Jun. 18, 2013

(54) ADVANCE TRIP COUNT COMPUTATION IN A CONCURRENT PROCESSING ENVIRONMENT

(75) Inventor: Arch D. Robison, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 1483 days.

(21) Appl. No.: 12/057,287

(22) Filed: Mar. 27, 2008

(65) Prior Publication Data

US 2009/0248776 A1 Oct. 1, 2009

(51) Int. Cl.
*G06F 9/45* (2006.01)
(52) U.S. Cl.
USPC .......................................................... 717/150
(58) Field of Classification Search
None
See application file for complete search history.

(56) References Cited

U.S. PATENT DOCUMENTS

| | | | | |
|---|---|---|---|---|
| 5,138,640 A | * | 8/1992 | Fleck et al. | 377/39 |
| 5,524,242 A | * | 6/1996 | Aida et al. | 717/149 |
| 5,974,538 A | * | 10/1999 | Wilmot, II | 712/218 |
| 7,047,270 B2 | * | 5/2006 | Agarwala et al. | 708/498 |
| 2004/0103128 A1 | * | 5/2004 | Agarwala et al. | 708/200 |
| 2006/0048119 A1 | * | 3/2006 | Ren et al. | 717/160 |

OTHER PUBLICATIONS

Weisstein, Eric W. "Congruence." From MathWorld—A Wolfram Web Resource. pp. 1-4. http://mathworld.wolfram.com/Congruence.html.*
Weisstein, Eric W. "Minimal Residue." From MathWorld—A Wolfram Web Resource. http://mathworld.wolfram.com/MinimalResidue.html.*
Hewlett-Packard. "Parallel Programming Guide for HP-UX Systems." Sep. 2007. HP Invent, Eighth Edition, Part No. B3909-90031. pp. 200-210.c1.*

* cited by examiner

*Primary Examiner* — Insun Kang
*Assistant Examiner* — Erika Kretzmer
(74) *Attorney, Agent, or Firm* — Garrett IP, LLC (57) ABSTRACT

A method for computing a trip count for a loop in advance of the execution of the loop is provided. The method comprises identifying the elements of a loop; returning infinity, if a first index value satisfies a first condition and that a first step size is equal to zero; modifying the first index value and the first step size, if the first index value satisfies the first condition, when the first step size is not equal to zero, and the first step size is greater than half of a first modulus; returning the result computed by applying a formula that divides the difference between a first condition value and the first index value by the first step size and rounds up to a next integer when there is a non-zero remainder; and returning a second trip count for a second loop based on the elements of the first loop.

18 Claims, 7 Drawing Sheets

| | Loop Form | Trip Count |
|---|---|---|
| 1 | for (unsigned i=a; i<b; i+=c) | FastTripCount (a, b, c, UINT_MAX) |
| 2 | for (unsigned i=a; i≤b; i+=c) | b==UNIT_MAX ? infinity : FastTripCount (a, b+1, c, UINT_MAX) |
| 3 | for (unsigned i=a; i>b; i+=c) | FastTripCount (UINT_MAX-a, UINT_MAX-b, -c, UINT_MAX) |
| 4 | for (unsigned i=a; i≥b; i+=c) | b==0 ? 0 : FastTripCount (UINT_MAX-a, UINT_MAX-b+1, -c, UINT_MAX) |
| 5 | for (unsigned i=a; i≠b; i+=c) | FastTripCount (UINT_MAX-b+a, UINT_MAX, c, UINT_MAX) |
| 6 | for (unsigned i=a; i==b; i+=c) | a≠b ? 0 : c==0 ? infinity : 1 |
| 7 | for (int i=a; i<b; i+=c) | FastTripCount (a-INT_MIN, b-INT_MIN, unsigned (c), UINT_MAX) |
| 8 | for (int i=a; i≤b; i+=c) | b==INT_MAX ? infinity : FastTripCount (a, b+1, c, INT_MAX) |
| 9 | for (int i=a; i>b; i+=c) | FastTripCount (INT_MAX-a, INT_MAX-b, -c, UINT_MAX) |
| 10 | for (int i=a; i≥b; i+=c) | b==INT_MIN ? 0 : FastTripCount (INT_MAX-a, INT_MAX-b+1, -c, UINT_MAX) |
| 11 | for (int i=a; i≠b; i+=c) | FastTripCount (UINT_MAX-b+a, UINT_MAX, c, UINT_MAX) |
| 12 | for (int i=a; i==b; i+=c) | a≠b ? 0 : c==0 ? infinity : 1 |

```
TripCount FastTripCount (unsigned a, unsigned b, unsigned c, unsigned m) { if (a≥b) {

// Trip count is zero
        return 0;
    } else if (c==0) {

// Trip count is infinite
        return infinity;
    } else { if (c > m/2) {
            // Nominally downwards steps, so flip
            c = m+1-c;
            a = b-(a+1);
        } if (c ≤ m-(b-1)) {
            // Wrap-around is not enabled
            Return (b-a-1)/c+1;
        } else {
            // Modulus reduction
            unsigned z = m-c+1;
            unsigned s = m/c;
            unsigned d = s×c-z;
            unsigned j = (m-a)/c;
            unsigned k = a+c×j-z;
            TripCount w = FastTripCount (k, b-z, d, c-1);
            unsigned t = (w×d+k)/c with extended precision;
            return j+w×(s+1)-t;
        }
    }
}
```

*FIG. 1*

| Trip # | i | i' |
|---|---|---|
| 0 | 16 | |
| 1 | 38 | |
| 2 | 60 | |
| 3 | 82 | 4 |
| 4 | 4 | |
| 5 | 26 | |
| 6 | 48 | |
| 7 | 70 | |
| 8 | 92 | 14 |
| 9 | 14 | |
| 10 | 36 | |
| 11 | 58 | |
| 12 | 80 | 2 |
| 13 | 2 | |
| 14 | 24 | |
| 15 | 46 | |
| 16 | 68 | |
| 17 | 90 | 12 |
| 18 | 12 | |
| 19 | 34 | |
| 20 | 56 | |
| 21 | 78 | 0 |
| 22 | 0 | |
| 23 | 22 | |
| 24 | 44 | |
| 25 | 66 | |
| 26 | 88 | 10 |
| 27 | 10 | |
| 28 | 32 | |
| 29 | 54 | |
| 30 | 76 | |
| 31 | 98 | 20 |

| | Loop Form | Trip Count |
|---|---|---|
| 1 | `for (unsigned i=a; i<b; i+=c)` | `FastTripCount (a, b, c, UINT_MAX)` |
| 2 | `for (unsigned i=a; i≤b; i+=c)` | `b==UNIT_MAX ? infinity : FastTripCount (a, b+1, c, UINT_MAX)` |
| 3 | `for (unsigned i=a; i>b; i+=c)` | `FastTripCount (UINT_MAX-a, UINT_MAX-b, -c, UINT_MAX)` |
| 4 | `for (unsigned i=a; i≥b; i+=c)` | `b==0 ? 0 : FastTripCount (UINT_MAX-a, UINT_MAX-b+1, -c, UINT_MAX)` |
| 5 | `for (unsigned i=a; i≠b; i+=c)` | `FastTripCount (UINT_MAX-b+a, UINT_MAX, c, UINT_MAX)` |
| 6 | `for (unsigned i=a; i==b; i+=c)` | `a≠b ? 0 : c==0 ? infinity : 1` |
| 7 | `for (int i=a; i<b; i+=c)` | `FastTripCount (a-INT_MIN, b-INT_MIN, unsigned (c), UINT_MAX)` |
| 8 | `for (int i=a; i≤b; i+=c)` | `b==INT_MAX ? infinity : FastTripCount (a, b+1, c, INT_MAX)` |
| 9 | `for (int i=a; i>b; i+=c)` | `FastTripCount (INT_MAX-a, INT_MAX-b, -c, UINT_MAX)` |
| 10 | `for (int i=a; i≥b; i+=c)` | `b==INT_MIN ? 0 : FastTripCount (INT_MAX-a, INT_MAX-b+1, -c, UINT_MAX)` |
| 11 | `for (int i=a; i≠b; i+=c)` | `FastTripCount (UINT_MAX-b+a, UINT_MAX, c, UINT_MAX)` |
| 12 | `for (int i=a; i==b; i+=c)` | `a≠b ? 0 : c==0 ? infinity : 1` |

ADVANCE TRIP COUNT COMPUTATION IN A CONCURRENT PROCESSING ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present disclosure relates generally to parallel computing and, more particularly, to a method for efficiently computing trip count for a computation loop.

BACKGROUND

Parallel computing is a form of computing in which multiple pieces of computational work are done simultaneously. Parallel computing requires partitioning work into independent pieces that run in parallel. This partitioning may be difficult to achieve.

Typically, to partition the work of a computation loop, it is best if the trip count or the number of iterations for the loop is determined before executing the loop. Dynamically partitioning work on the fly without knowing the trip count incurs significantly more overhead for synchronization. Computing the trip count in advance of loop execution may be difficult in computer programming languages such as C, C++, Java and C# that have integer arithmetic types that can wrap around on overflow.

Given this difficulty, there is a need for a method for computing a loop's trip count in an accurate and efficient manner in the presence of wrap-around arithmetic before the loop is executed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

The present invention is directed to systems and methods for efficiently computing trip count for a loop.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

A method for computing a trip count for a first loop in advance of the execution of the first loop is provided. The method comprises identifying, for the first loop, a first index value, a first condition value associated with a first condition, a first step size, and a first modulus; returning zero, in response to the first index value failing to satisfy the first condition value; returning infinity, in response to determining that the first index value satisfies the first condition and that the first step size is equal to zero; and modifying the first index value and the first step size, in response to determining that the first index value satisfies the first condition, when the first step size is not equal to zero, and the first step size is greater than half of the first modulus.

The method may further comprise returning the result computed by applying a formula that divides the difference between the first condition value and the first index value by the first step size and rounds up to a next integer when there is a non-zero remainder; and returning a second trip count for a second loop, wherein the second loop comprises a second index value, a second condition value for a second condition, a second step size, and a second modulus that are based on a zone computed from the first index value, the first condition value, the first step size, and the first modulus.

In accordance with another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed. For brevity, the symbols "+", "−", "×", and "/" have their usual meaning for integer arithmetic. "+" denotes addition, "−" denotes subtraction, and "×" denotes multiplication. "/" denotes integer division that discards the remainder (e.g., 7/2==3), where the divisor may also be referred to as a modulus (i.e., mod). The notation "==" denotes comparison for equality, and is used to avoid confusion where "=" denotes assignment.

In computer programming, a loop refers to a sequence of statements which is specified once but which may be carried out several times in succession by a computer. The code inside the loop (i.e., the body of the loop) is executed a specified number of times, or once for each of a collection of items, or until some condition is met. Most programming languages have constructions for defining a loop.

In accordance with one embodiment, a computation loop (e.g., represented as "set i=a; while i<b, perform XXXXX and increment i by c") may comprise an initial index value (e.g., a), a condition value (e.g., b), and a step size (e.g., c). The initial index value may indicate the initial or starting value for a loop index (e.g., "set i=a"), which may be signed or unsigned. The condition value may be compared to the loop index to determine whether to allow instructions within the loop to be executed (e.g., "while i<b"). The step size may modify the loop index (e.g., i+=c), causing the loop index to step closer to or further away from satisfying the condition indicated by the condition value after an instruction XXXXX is carried out.

Overflow may occur when a value that is outside a defined range for a variable is assigned to that variable. For example, if a value of 128 is assigned to a variable (e.g., i) that is declared as a type having 7 bits with a range from 0 (i.e., 0000000 in binary format) to 127 (i.e., 1111111 in binary format), then the variable overflows because 128 is greater than the upper bound of 127 in the defined range. If wrap-around is not enabled, the variable may be set equal to 127, as the assigned value may not be greater than the largest value in the assigned range or an arithmetic exception signal may be issued. If wrap-around is enabled, the variable may be set equal to 0 (e.g., 128 mod (127+1)), as the assigned value wraps around after passing the largest value in the range (i.e., 127) to start over from the lowest value in the range (i.e., values in the defined range form a cycle of successive values, with 0 coming after 127).

Computing trip count for a loop when wrap-around on overflow occurs may be difficult. For example, an exemplary loop "for (unsigned i=0; i<127; i+=3)" may have a trip count of 85 because loop index i runs by multiples of 3 from 0 to 126 (43 trips), wraps around, and then runs from 1 to 127 (42 trips). As such, wrap-around may cause the trip count to increase. In some loops, wrap-around may occur more than once and up to infinity. For example, a loop defined by "for (unsigned i=0; i<127; i+=2)" computationally never terminates, because index i runs by multiples of 2 from 0 to 126 (e.g., (i+2) mod (127+1)), wraps around back to 0 after being incremented by 2, and then runs from 0 to 126 again and then wraps around back to 0, and so on forever (i.e., until infinity) because i is always less than 127 before and after the wrap-around.

Figure 1:
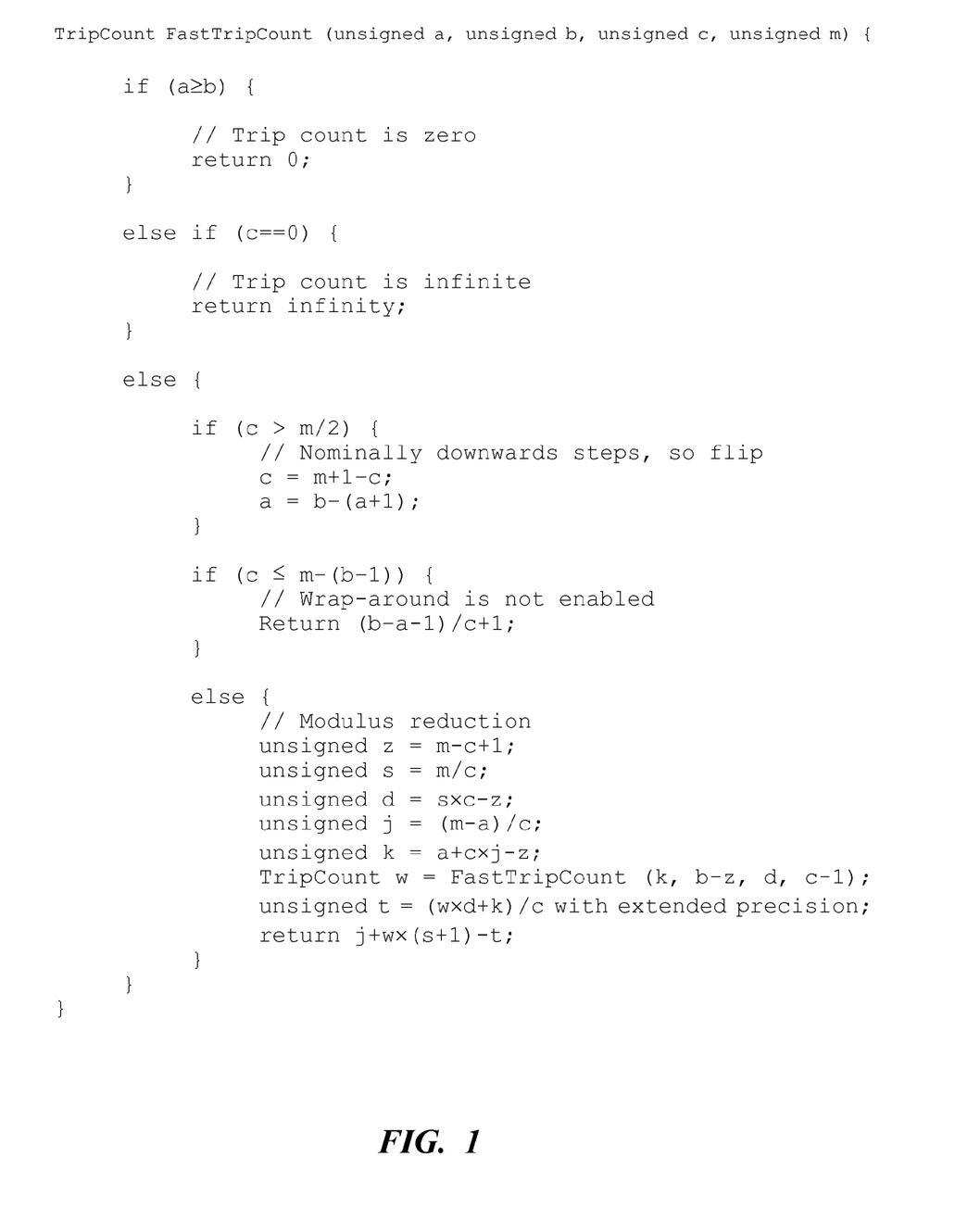
FIG. 1 is pseudo code of an exemplary routine for computing trip count for a loop, in accordance with one embodiment.

FIG. 1, in accordance with one embodiment, illustrates a pseudo code that outlines an exemplary routine (e.g., FastTripCount) for computing trip count for a loop defined as "for (unsigned i=a; i<b; i=(i+c) mod (m+1))." i refers to the loop index, a refers to i's initial value, and i+c refers to i's value after i has been incremented by step size c. i<b refers to the condition to be satisfied for the body of the loop to be executed. m refers to the maximum possible value of i, and m+1 refers to the total possible values of i. (i+c) mod (m+1) refers to the value of i with wrap-around. In certain embodiments, (i+c) mod (m+1) may be computed exactly (e.g., with extra precision if necessary to retain algebraic values). The exemplary routine, in one embodiment, is implemented with single precision unsigned arithmetic, except for the computation of t on line 36.

If i is greater than or equal to b (e.g., i≧b), the condition i<b is not satisfied and the routine (e.g., FastTripCount) may return a trip count of 0 (lines 3-7) because the body of the loop will never be executed. If i is less than b (e.g., i<b) and c is equal to 0 (e.g., c==0), the routine may return infinity (lines 9-13) because i cannot reach b because i with a step size c of 0. If i is less than b and c exceeds half the modulus (e.g., c>m/2), the routine may set c (c is nominally a downwards step) to be a symmetrically similar upwards step and adjust a so that the loop has the same total trip count as before (lines 15-21). Flipping, or taking the mirror image of the loop, may allow the routine to take O(lg(N)) time instead of O(N) time, where N=max (a, b, c, m).

If i is less than b and c is not equal to 0, the routine determines whether wrap-around may occur for this instance of the loop execution. If wrap-around cannot occur (e.g., c≦m−(b−1)), the routine may use a direct formula (e.g., (b−a−1)/c+1) to compute trip count (lines 23-26). The exemplary condition defined as c≦m−(b−1) determines whether the loop index i can jump over (without landing on) the interval from b to m−1. The formula (b−a−1)/c+1 determines the number of steps i has to take to reach b from a when the step size is c. The formula is equivalent to dividing the difference b−a by c and rounding up to the next integer when the remainder is not zero. Because most computing hardware implements rounding down when division is inexact, the formula (b−a−1)/c+1 is usually a better choice than dividing b−a by c and rounding up when the remainder is not zero.

If wrap-around may occur for this instance of the loop execution, the routine (e.g., FastTripCount) may reduce the loop's modulus m+1 to a smaller modulus c (lines 27-37). Still referring to FIG. 1, z refers to the beginning of a zone or closed interval [z, m] (i.e., the set of integers inclusively between z and m); s refers to the fewest loop iterations that may advance a certain index in the zone (e.g., a first zone) to another index in the zone (e.g., a second zone); d refers to i's advances in the zone after s iterations; j refers to the number of iterations required to advance i from a into the zone; k refers to the zone-relative value of i on the jth iteration; w refers to the trip count for reduced modulus problem, the number of times that i wraps around; and t refers to a correction that adjusts for the fact that some wrap-arounds take s iterations and some take s+1 iterations (lines 27-37). j+w×(s+)−t refers to the final trip count. j refers to the number of initial trips for i to reach the zone. w×(s+1) refers to w number of wrap-arounds with s+1 trips per wrap-around. −t adjusts for the fact that some wrap-arounds take s trips and not s+1 trips.

Figure 2:
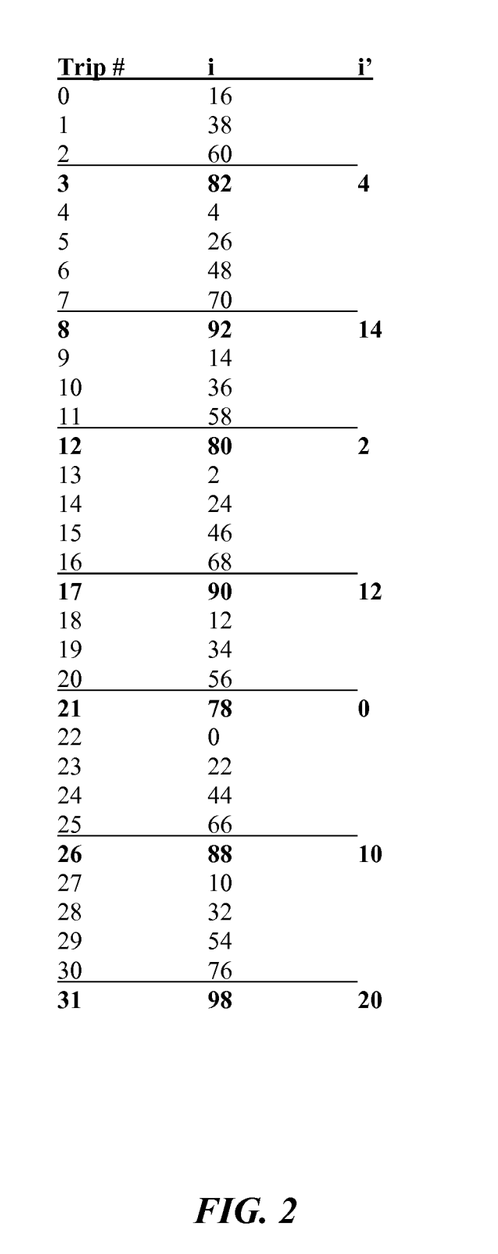
FIG. 2 is a table that illustrates a zone concept in association with a solution for computing trip count, in accordance with one embodiment.

In accordance with one or more embodiments, a modulus reduction scheme may be implemented with reference to a predefined range or zone as provided in further detail below. Referring to FIG. 2, for example, a loop index i may land either inside or outside a zone (i.e., closed range [z, m]) before wrapping around. If the values of i outside the zone are ignored, the values of i inside the zone behave as if part of a loop index i' for another loop such that z=m−c+1, and i'=i−z.

For example, in a trip count problem for an exemplary loop defined as "for (unsigned i=a; i<b; i=(i+c) mod (m+1))" with a=16, b=93, c=22, and m=99, the zone is defined by a range [78, 99]. The first column shows the trip index, which starts at 0 and advances incrementally. The second column shows the corresponding value of i. The loop terminates when i=98. The third column shows the value of i' when i lands in the zone. The values of i' behave as if part of another exemplary loop defined as "for (unsigned i=4; i<15; i=(i+10) mod (21+1))." Therefore, the larger problem with a=16, b=93, c=22, and m=99 may be reduced to a smaller problem with a=4, b=15, c=10, and m=21, by way of utilizing a recursive algorithm which leads to solving the large problem efficiently, since it breaks the large problem down into exponentially smaller problems. Because each step is exponentially smaller, the total number of recursive calls can be limited to not exceed a value proportional to the logarithm of the original modulus.

Figure 3A:
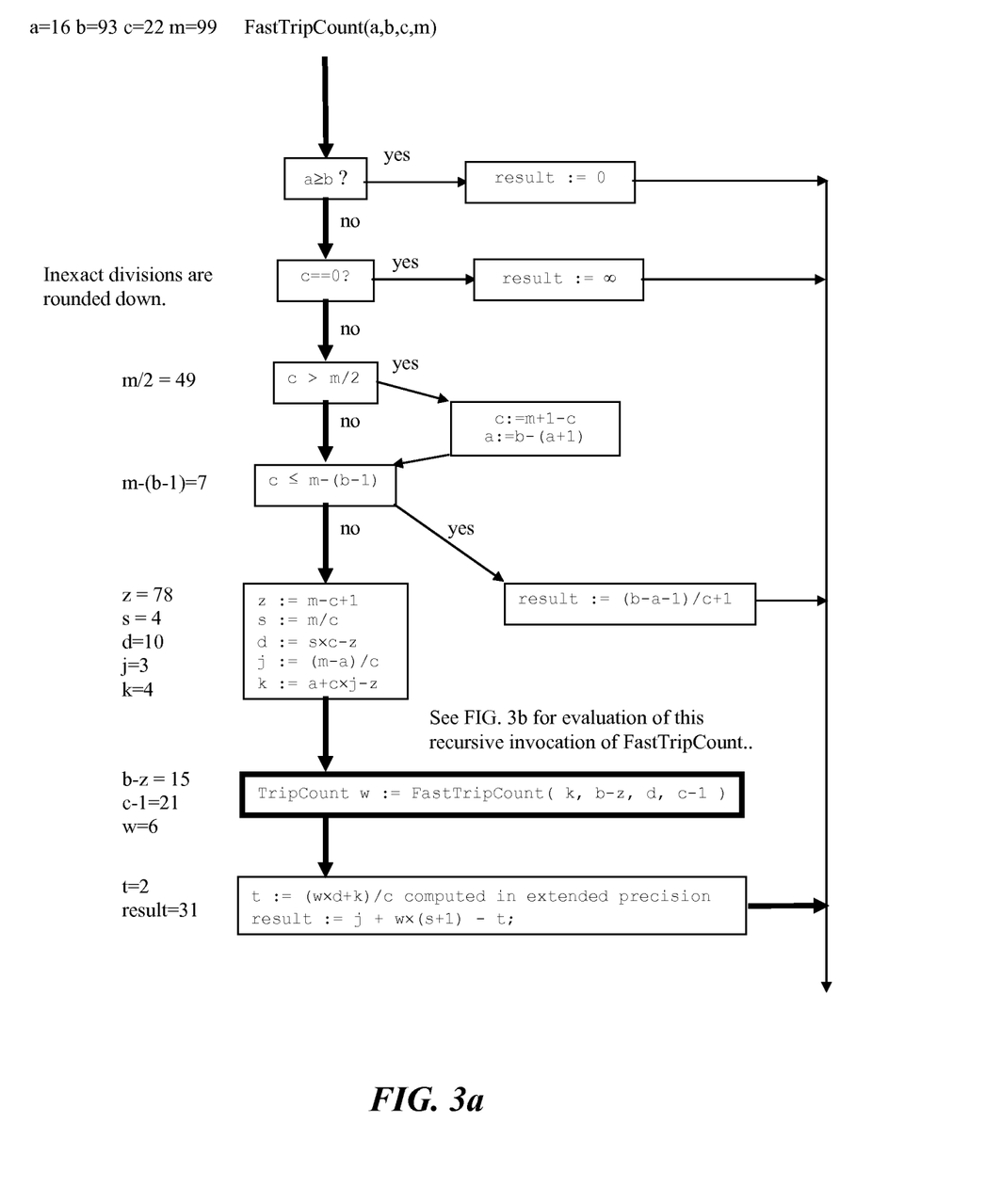
FIGS. 3a through 3d are flow diagrams of one or more methods for computing trip count for an example loop, in accordance with one embodiment.
Figure 3B:
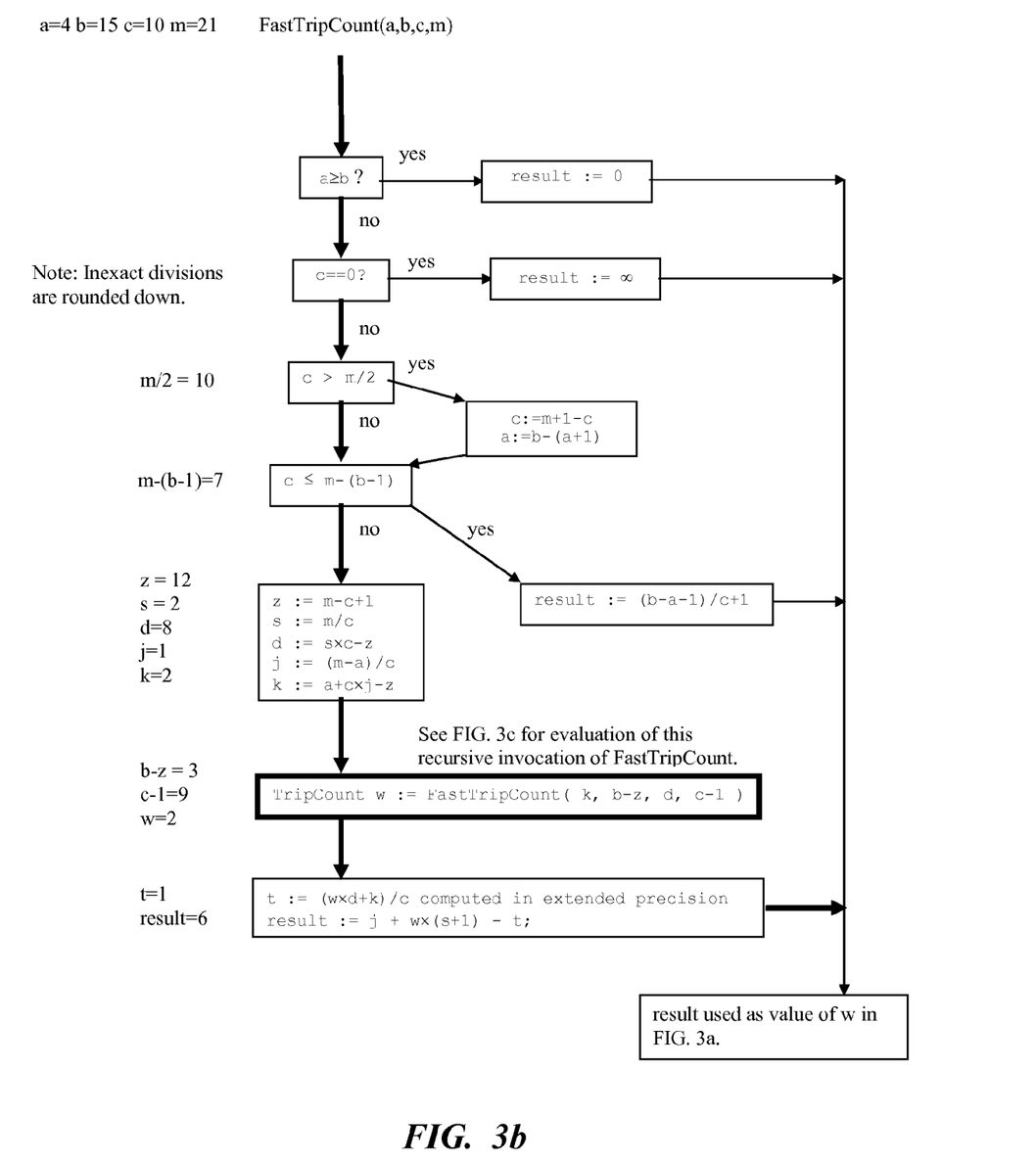
Figure 3C:
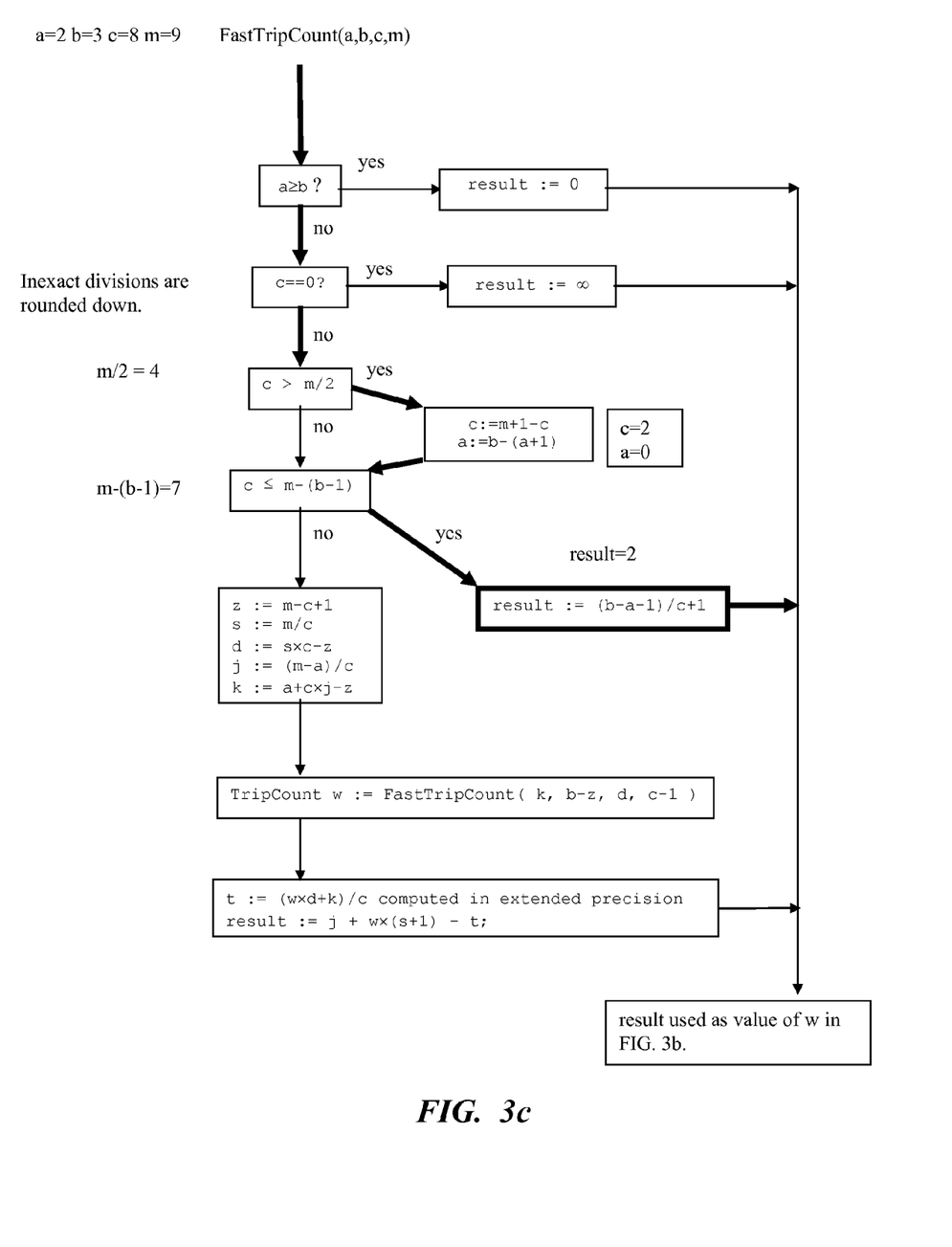
Figure 3D:
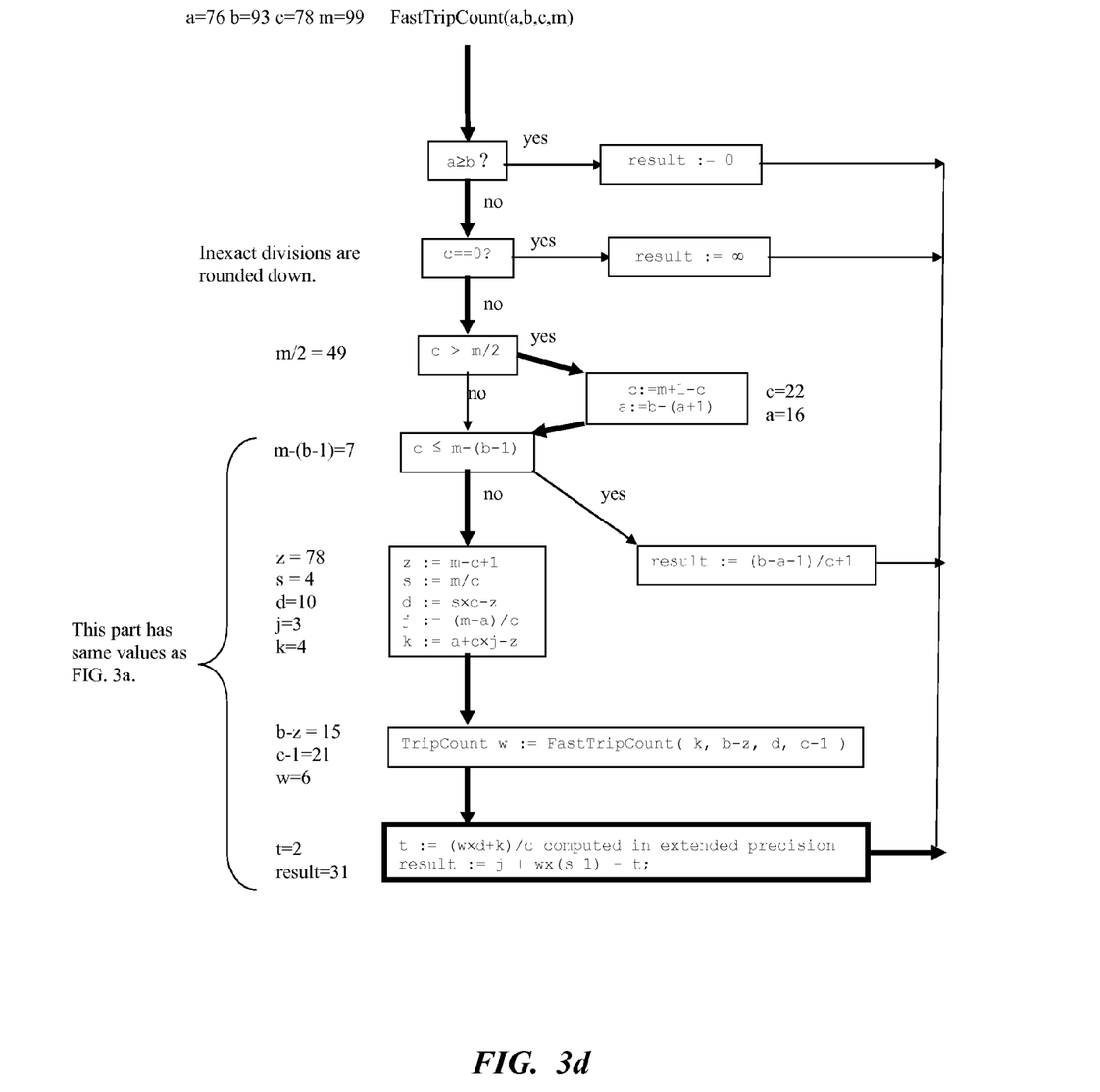

Referring to FIGS. 1 and 3a-3d, in accordance with one embodiment, if the routine (e.g., FastTripCount) is called with a=16, b=93, c=22, and m=99, the modulus reduction case is invoked recursively 2 times (see FIGS. 3a-3b). The innermost recursive call invokes the case where wrap-around is not enabled and returns a trip count using a standard formula (see FIG. 3c). As shown in FIG. 3d, the final result from the recursive calls is stored in w, and w is used to compute t. Both w and t are used to compute the total trip count for the original call to the routine (e.g., FastTripCount).

Figure 4:
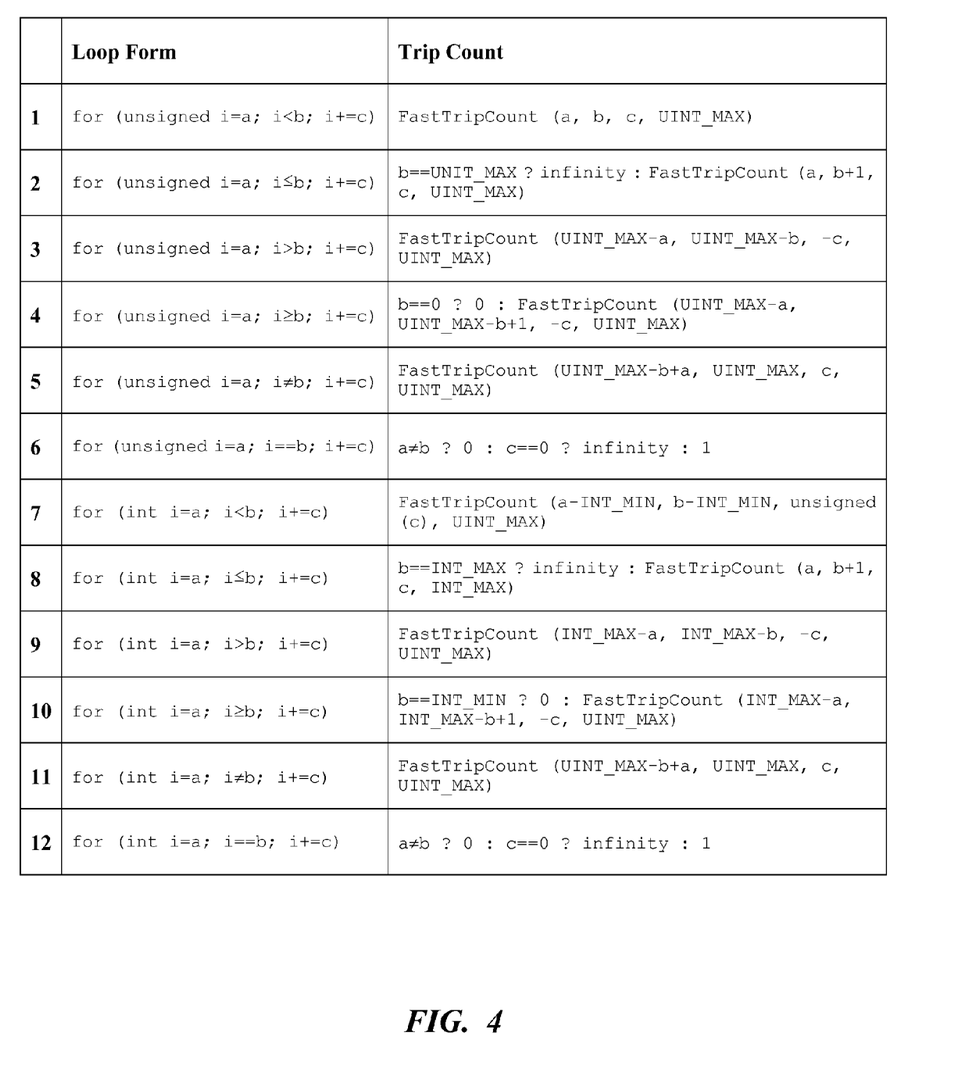
FIG. 4 is a table that demonstrates computation of trip count with various loop forms, in accordance with one embodiment.

FIG. 4, in accordance with one embodiment, illustrates the application of the routine in FIG. 1 to various loop forms. UINT_MAX refers to the maximum value for an unsigned value. INT_MIN and INT_MAX refer to the minimum and maximum values, respectively, for a signed value. The notation p ? q : r means "if p is true use the value q; else use the value r". Depending on implementation, a loop may be implemented with a structure other than a "for" loop (e.g., while, do-while, and other loop structures). It is noteworthy that the methods provided herein are not limited to any one implementation and may differ depending on the nature of a problem, the particular computer programming language utilized, and the particular syntaxes involved.

It should be understood that the logic code, programs, modules, processes, methods, and the order in which the respective elements of each method are performed in the above are purely exemplary. Depending on implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips may be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product may be any product that includes integrated circuit chips, ranging from toys and other low-end applications to advanced computer products having a display, a keyboard or other input device, and a central processor.

Therefore, it should be understood that the invention may be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method of parallelizing execution of a computer program, comprising:
    determining a trip count for a loop of the computer program in advance of executing the loop, the determining including:
        identifying, for the loop, a first index value, a first condition value associated with a first condition, a first step size, and a first modulus;
        if the first index value does not satisfy the first condition, then
            setting the trip count to zero;
        if the first index value satisfies the first condition, and the first step size is equal to zero, then
            setting the trip count to infinity;
        if the first index value satisfies the first condition, and the first step size is not equal zero and is greater than half of the first modulus, then
            modifying the first index value and the first step size; and
        if the first index value satisfies the first condition, and the first step size is not equal to zero and is less than or equal to a difference between the first modulus and the first condition value,
        then
            setting the trip count to a value that is based on a difference between the first condition value and the first index value divided by the first step size and rounded up to a next integer when there is a non-zero remainder, else:
                calculating a zone based on the first step size and the first modulus;
                recursively performing the determining a trip count using a second index value, a second condition value associated with a second condition, a second step size, and a second modulus, each based on the zone, to return a recursive trip count value; and
                updating the trip count based on the returned, recursive trip count value;
    parallelizing the loop of the computer program based on the trip count; and
    executing the parallelized loop on multiple computer processors.

2. The method of claim 1, wherein the second modulus is reduced relative to the first modulus.

3. The method of claim 2, wherein the second modulus is equal to the first step size.

4. The method of claim 1, wherein the zone is a closed range from a zone integer to the first modulus.

5. The method of claim 4, wherein the zone integer is approximately equal to the value of the first modulus minus the step size plus 1.

6. The method of claim 1, wherein modifying includes:
    setting the first step size to the first modulus minus the first step size; and
    setting the first index value to the first condition value less one more than the first index value.

7. A system for parallelizing execution of a computer program on multiple processors, comprising:
    one or more of the multiple processors configured to determine a trip count for a loop of the computer program in advance of executing the loop, wherein the one or more of the multiple processors are configured to:
        identify, for the loop, a first index value, a first condition value associated with a first condition, a first step size, and a first modulus;
        if the first index value does not satisfy the first condition, then
            set the trip count to zero;
        if the first index value satisfies the first condition, and the first step size is equal to zero, then
            set the trip count to infinity;
        if the first index value satisfies the first condition, and the first step size is not equal zero and is greater than half of the first modulus, then
            modify the first index value and the first step size; and
        if the first index value satisfies the first condition, and the first step size is not equal to zero and is less than or equal to a difference between the first modulus and the first condition value, then
    set the trip count to a value that is based on a difference between the first condition value and the first index value divided by the first step size and rounded up to a next integer when there is a non-zero remainder, else:
    calculate a zone based on the first step size and the first modulus;
    recursively perform the determine a trip count using a second index value, a second condition value associated with a second condition, a second step size, and a second modulus, each based on the zone, to return a recursive trip count value; and
    update the trip count based on the returned, recursive trip count value;
parallelize the loop of the computer program based on the trip count; and
execute the parallelized loop on the multiple computer processors.

8. The system of claim 7, wherein the second modulus is reduced relative to the first modulus.

9. The system of claim 8, wherein the second modulus is equal to the first step size.

10. The system of claim 7, wherein the zone is a closed range from a zone integer to the first modulus.

11. The system of claim 10, wherein the zone integer is approximately equal to the value of the first modulus minus the step size plus 1.

12. The method of claim 7, wherein the one or more processors are further configured to:
    set the first step size to the first modulus minus the first step size, in order to modify the first step size; and
    set the first index value to the first condition value less one more than the first index value, in order to modify the first step size.

13. A non-transitory computer readable medium encoded with a computer program, including instructions to cause a processor to:
    determine a trip count for a loop of a computer program in advance of executing the loop, wherein the instructions to cause the processor to determine further include instructions to cause the processor to:
    identify, for the loop, a first index value, a first condition value associated with a first condition, a first step size, and a first modulus;
    if the first index value does not satisfy the first condition, then
        set the trip count to zero;
    if the first index value satisfies the first condition, and the first step size is equal to zero, then
        set the trip count to infinity;
    if the first index value satisfies the first condition, and the first step size is not equal zero and is greater than half of the first modulus, then
        modify the first index value and the first step size; and
    if the first index value satisfies the first condition, and the first step size is not equal to zero and is less than or equal to a difference between the first modulus and the first condition value,
    then
        set the trip count to a value that is based on a difference between the first condition value and the first index value divided by the first step size and rounded up to a next integer when there is a non-zero remainder, else:
        calculate a zone based on the first step size and the first modulus;
        recursively perform the determine a trip count using a second index value, a second condition value associated with a second condition, a second step size, and a second modulus, each based on the zone, to return a recursive trip count value; and
        update the trip count based on the returned, recursive trip count value;
    parallelize the loop of the computer program based on the trip count; and
    execute the parallelized loop on multiple computer processors.

14. The computer readable medium of claim 13, wherein the second modulus is reduced relative to the first modulus.

15. The computer readable medium of claim 14, wherein the second modulus is equal to the first step size.

16. The computer readable medium of claim 13, wherein the zone is a closed range from a zone integer to the first modulus.

17. The computer readable medium of claim 16, wherein the zone integer is approximately equal to the value of the first modulus minus the step size plus 1.

18. The computer readable medium of claim 13, wherein the instructions to cause the processor to modify include instructions to cause the processor to:
    set the first step size to the first modulus minus the first step size; and
    set the first index value to the first condition value less one more than the first index value.

* * * * *